US012737125B2

(12) United States Patent
Sugimoto et al.

(10) Patent No.: US 12,737,125 B2
(45) Date of Patent: Sep. 15, 2026

(54) STORAGE SYSTEM AND DATA PROTECTION METHOD

(71) Applicant: Hitachi, Ltd., Tokyo (JP)

(72) Inventors: Sadahiro Sugimoto, Tokyo (JP); Norio Shimozono, Tokyo (JP); Tomohiro Yoshihara, Tokyo (JP); Shintaro Ito, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 0 days.

(21) Appl. No.: 18/368,755

(22) Filed: Sep. 15, 2023

(65) Prior Publication Data

US 2024/0295968 A1 Sep. 5, 2024

(30) Foreign Application Priority Data

Mar. 2, 2023 (JP) ................................ 2023-032035

(51) Int. Cl.
*G06F 3/00* (2006.01)
*G06F 3/06* (2006.01)
(Continued)

(52) U.S. Cl.
CPC .......... *G06F 3/0619* (2013.01); *G06F 3/0659* (2013.01); *G06F 3/0673* (2013.01);
(Continued)

(58) Field of Classification Search
CPC ... G06F 11/1448–1464; G06F 11/1471; G06F 11/2071; G06F 2212/285;
(Continued)

(56) References Cited

U.S. PATENT DOCUMENTS 5,274,645 A * 12/1993 Idleman ................ G06F 11/201
714/766
7,111,189 B1 * 9/2006 Sicola ................ G06F 11/2092
714/6.21

(Continued)

FOREIGN PATENT DOCUMENTS

JP 06-309232 A 11/1994
JP 2011-170589 A 9/2011

OTHER PUBLICATIONS

Japanese Office Action received in corresponding Japanese Application No. 2025-081757 dated Mar. 31, 2026.

*Primary Examiner* — Reginald G Bragdon
*Assistant Examiner* — Michael L Westbrook
(74) *Attorney, Agent, or Firm* — MATTINGLY & MALUR, PC

(57) ABSTRACT

A storage system includes a non-volatile storage device and a plurality of storage controllers that control reading and writing for the storage device, in which each of the plurality of storage controllers includes a processor and a memory, the storage controller stores a write request from a host for the storage device as cache data in the memory, returns a write completion response to the host after protecting the cache data in a first memory protection method or a second memory protection method, and destages the cache data into the storage device after the write completion response, and the storage controller switches between the first memory protection method and the second memory protection method to be used according to an operation state of another storage controller.

10 Claims, 17 Drawing Sheets

(51) Int. Cl.

| | |
|---|---|
| ***G06F 11/00*** | (2006.01) |
| ***G06F 11/1446*** | (2026.01) |
| ***G06F 11/1471*** | (2026.01) |
| ***G06F 11/20*** | (2006.01) |
| ***G06F 12/00*** | (2006.01) |
| ***G06F 12/0802*** | (2016.01) |

(52) U.S. Cl.
CPC ...... *G06F 11/1448* (2013.01); *G06F 11/1461* (2013.01); *G06F 11/1469* (2013.01); *G06F 11/1471* (2013.01); *G06F 11/2071* (2013.01); *G06F 12/0802* (2013.01); *G06F 2212/285* (2013.01); *G06F 2212/286* (2013.01)

(58) Field of Classification Search
CPC ........... G06F 2212/286; G06F 12/0802; G06F 12/0804; G06F 12/0806
See application file for complete search history.

(56) References Cited

U.S. PATENT DOCUMENTS

| | | | | |
|---|---|---|---|---|
| 7,849,260 | B2 * | 12/2010 | Okuno | G06F 3/0611 710/22 |
| 2011/0202791 | A1 | 8/2011 | Saitou et al. | |
| 2018/0276142 | A1 | 9/2018 | Algieri et al. | |
| 2023/0305934 | A1 * | 9/2023 | Bhagi | G06F 11/1474 |

* cited by examiner

FIG. 16

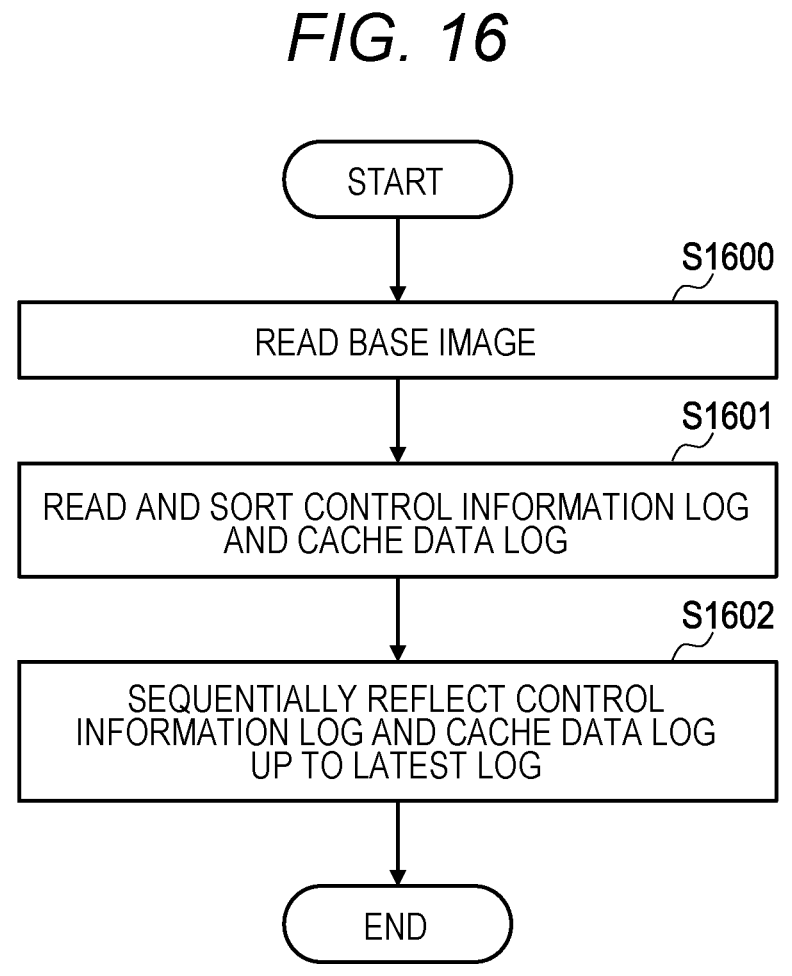

START

S1600

READ BASE IMAGE

S1601

READ AND SORT CONTROL INFORMATION LOG AND CACHE DATA LOG

S1602

SEQUENTIALLY REFLECT CONTROL INFORMATION LOG AND CACHE DATA LOG UP TO LATEST LOG

END

STORAGE SYSTEM AND DATA PROTECTION METHOD

REFERENCE TO RELATED APPLICATION

The present application claims priority from Japanese application JP2023-032035, filed on Mar. 2, 2023, the content of which is hereby incorporated by reference into this application.

BACKGROUND OF THE INVENTION

1. Field of the Invention

The present invention relates to a storage system and a data protection method.

2. Description of the Related Art

A storage system records write data received from a host in a drive via a cache memory (hereinafter, a cache). That is, the write data requested to be written by the host is temporarily stored in the cache and then written into a predetermined drive. Methods of writing data from the cache to the drive may be roughly divided into two types.

One method is a method called a write-through method, for example, and is a method of writing write data into a drive before returning a response to a write request to a host. The other method is, for example, a method called a write-back method or a write-after method, and is a method of returning a response to a write request to a host at the time at which write data is stored in a cache. In the case of the write-back method, writing of the write data into the drive is performed at a given timing after the write data is stored in the cache.

Therefore, in the case of the write-back method, since a response can be returned to the host without waiting for completion of writing into the drive, a response time can be reduced compared with the write-through method. On the other hand, in the case of the write-back method, data that has been written from the host is temporarily present only on the cache. Therefore, it is necessary to appropriately protect the write data on the cache, and for example, a storage system has a redundant configuration with a plurality of controllers, and copies write data received by a certain controller to a cache of another controller to secure the redundancy of the write data. For example, the cache is protected by a battery in order to prepare for a power cut or a failure of a power supply.

A storage system is required to have both high reliability and high performance. Therefore, in the storage system, the above write-through method and write-back method can be used according to a situation, and as disclosed in JP 6-309232 A, there is a usage method in which the storage system operates in the write-back method in a state in which a cache can be appropriately protected, and switches to the write-through method in a state in which the cache cannot be protected. With such a configuration, it is possible to return a response at a high speed by using the write-back method during a normal time, and it is possible to ensure reliability by using the write-through method even in a case where, for example, a controller fails and cache redundancy is lost.

SUMMARY OF THE INVENTION

However, in the above-described conventional method, there is a problem that the performance in the case where a storage system operates in the write-through method due to a controller failure or the like greatly deteriorates compared with the performance during a normal time in which the storage system operates in the write-back method. In particular, in recent storage systems, a data protection method such as a RAID 6 method has been generalized, and in order to store write data in a drive, it is necessary to read a plurality of pieces of data (a plurality of pieces of protected data such as old data and parity data for example) from the drive, update the parity data, and then write the write data and the plurality of pieces of parity data into the drive. By waiting for this drive access a plurality of times, write response time greatly deteriorates compared with the write-back method.

An object of the present invention is to enhance performance when cache redundancy is lost due to a controller failure or the like compared with a write-through method while ensuring high reliability in a storage system.

In order to solve the problem, according to the present invention, there is provided a storage system including a non-volatile storage device; and a plurality of storage controllers that control reading and writing for the storage device, in which the storage device is a user data storage drive, each of the plurality of storage controllers includes a processor and a memory, the storage controller includes a first memory protection method that is a memory copying method of copying data on the memory to a memory of a corresponding storage controller and a second memory protection method that is a log saving method of generating a log related to update of the data on the memory and writing the log into a non-volatile medium, the storage controller stores a write request from a host for the storage device as cache data in the memory, returns a write completion response to the host after protecting the cache data in the first memory protection method or the second memory protection method, and destages the cache data into the storage device after the write completion response, and the storage controller switches between the first memory protection method and the second memory protection method to be used according to an operation state of another storage controller.

According to the present invention, there is provided a data protection method of a storage system including a non-volatile storage device and a plurality of storage controllers that control reading and writing for the storage device, in which the storage device is a user data storage drive, and each of the plurality of storage controllers includes a processor and a memory, and the storage controller includes a first memory protection method that is a memory copying method of copying data on the memory to a memory of a corresponding storage controller and a second memory protection method that is a log saving method of generating a log related to update of the data on the memory and writing the log into a non-volatile medium, the data protection method including: storing, by the storage controller, a write request from a host for the storage device in the memory as cache data; protecting, by the storage controller, the cache data in the first memory protection method or the second memory protection method; returning, by the storage controller, a write completion response to the host; destaging, by the storage controller, the cache data into the storage device after the write completion response; and switching, by the storage controller, between the first memory protection method and the second memory protection method to be used according to an operation state of another storage controller.

According to the present invention, it is possible to realize a storage system and a data protection method having both high performance and high reliability.

BRIEF DESCRIPTION OF THE DRAWINGS

FIG. 16 is a flowchart illustrating a log recovery process; and

DESCRIPTION OF THE PREFERRED EMBODIMENTS

Hereinafter, embodiments of the present invention will be described with reference to the drawings. The embodiments relate to, for example, a storage system including a plurality of storage controllers.

Example 1

Figure 1:
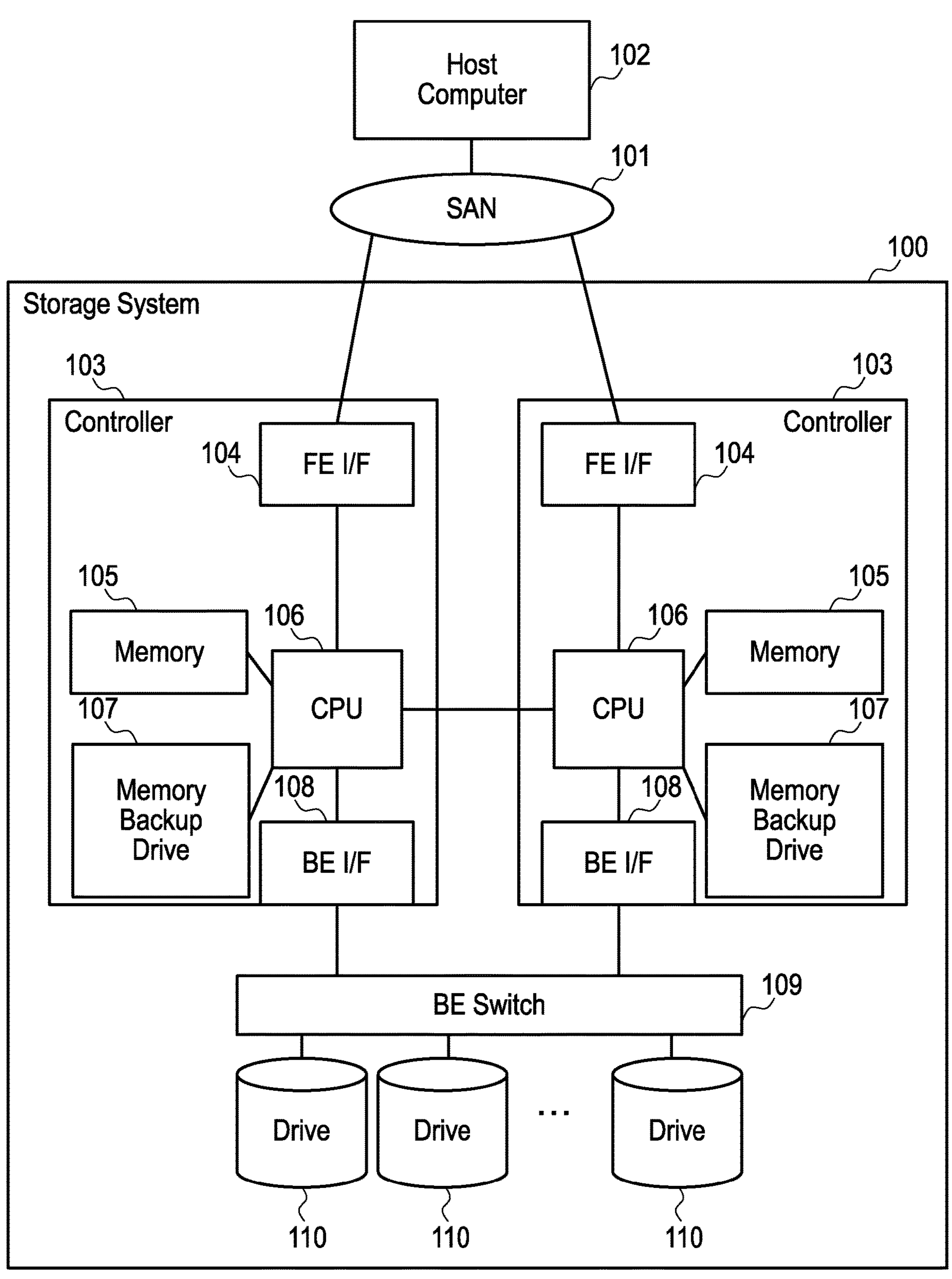
FIG. 1 is a configuration diagram of a storage system according to Example 1.

FIG. 1 is a diagram illustrating a configuration example of a storage system according to the present example of the present invention. A storage system 100 of the present example includes a plurality of controllers 103 and a drive 110 that is a storage device. The controller 103 is a device having a function of providing a host computer (hereinafter, referred to as a host) with a volume that is a target for reading and writing data. The controller 103 includes a CPU 106, a memory 105, a memory backup drive 107, a front end interface (FE I/F) 104, and a back end interface (BE I/F) 108. The drive is, for example, a solid state drive (SSD) using a flash memory as a storage medium or a hard disk drive (HDD) using a magnetic disk as a storage medium. The memory is a semiconductor memory such as a DRAM. The memory backup drive is a drive such as an SSD, and is used to save contents of a memory when external power is lost, for example. The FE I/F is, for example, a Fibre Channel Host Bus Adapter (HBA) or a Network Interface Controller (NIC). The BE I/F is, for example, a SAS HBA, a PCI Express (hereinafter, PCIe) adapter, or a NIC. Each controller and the drive are connected via, for example, a switch (BE Switch) 109. CPUs of the plurality of controllers are connected via an interconnect such as PCIe. The CPU and the CPU may be connected via, for example, a PCIe switch. The storage system is connected to a storage area network (SAN) 101 such as Fibre Channel or Ethernet, and the host 102 is also connected to the SAN 101. The SAN 101 may include a switch and the like. A plurality of hosts may be connected to the SAN 101.

Figure 2:
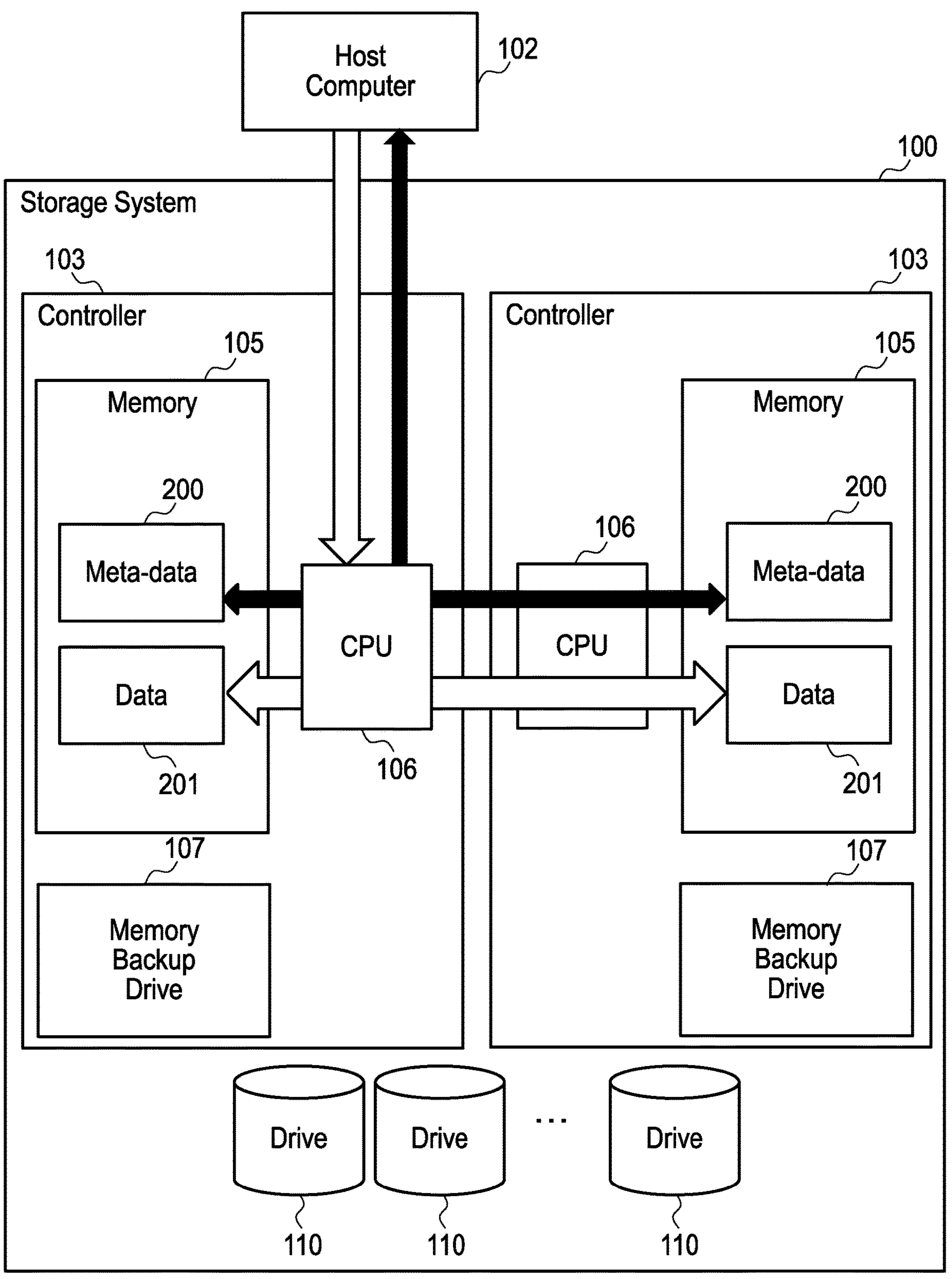
FIG. 2 is a diagram illustrating an outline of a write operation when both controllers are normal.

FIG. 2 is a diagram illustrating an outline of a write operation when both controllers are normal. The CPU 106 of the controller 103 of the present embodiment receives a write request from the host 102, receives data from the host, and writes data 201 into the memory 105 of the own controller and the memory 105 of the other controller. The CPU 106 updates control information (metadata) 200 in the memory. The CPU 106 returns a write completion response to the host 102. Although not illustrated, the CPU 106 writes the write data written on the memory into the drive at a given timing.

In this write operation, the write data and the control information on the memory are duplicated between the controllers to prepare for a controller failure.

Figure 3:
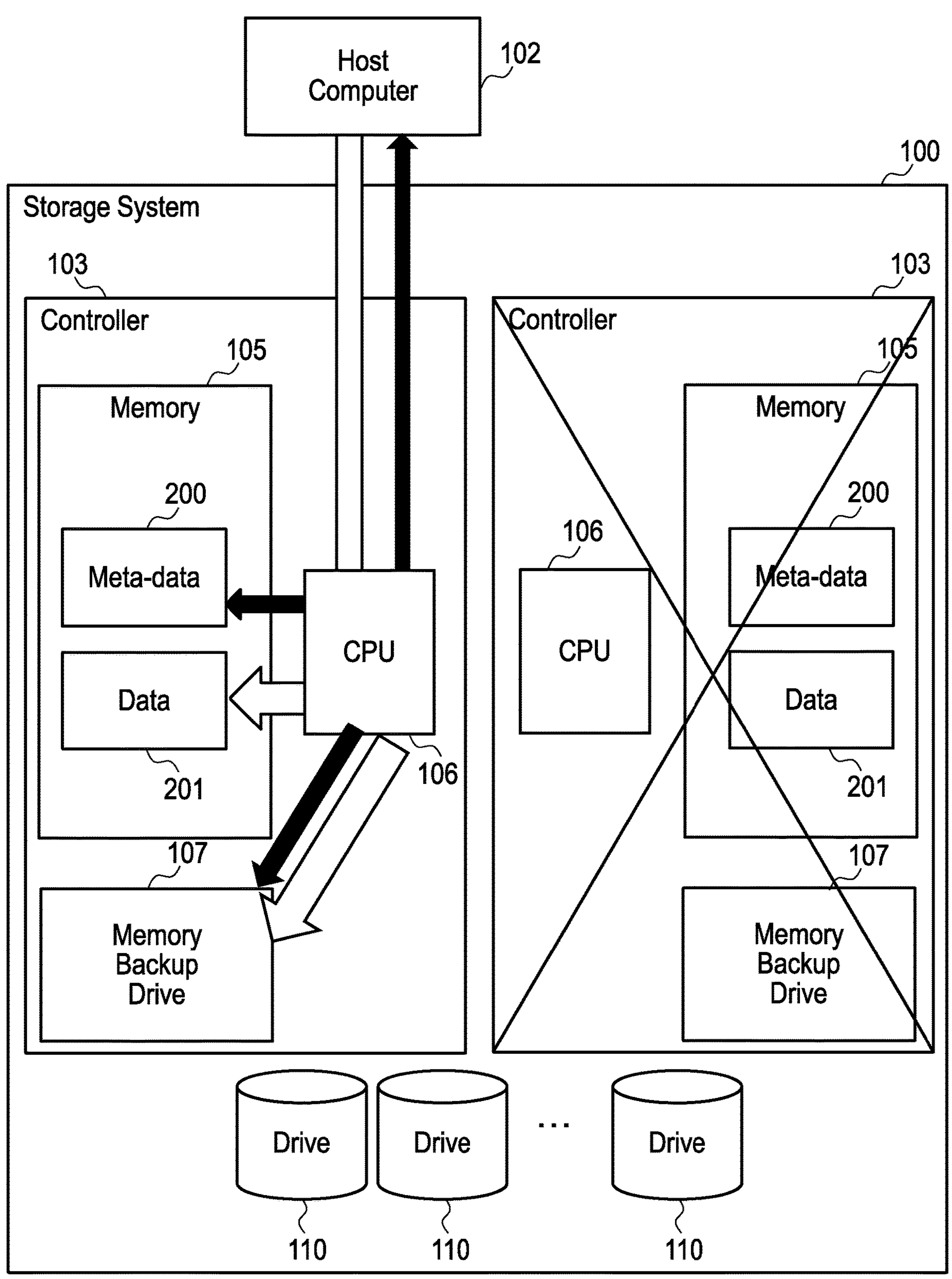
FIG. 3 is a diagram illustrating an outline of a write operation when one controller is failed.

FIG. 3 is a diagram illustrating an outline of a write operation when one controller is failed in the storage system of the present example. The CPU 106 of the controller 103 of the present embodiment receives a write request from the host 102, receives data from the host, and writes the data 201 into the memory 105 of the own controller. The CPU 106 updates control information (metadata) 200 in the memory. The CPU 106 writes update contents of the data as a log into the memory backup drive 107, and writes update contents of the control information as a log into the memory backup drive 107 (log saving). The CPU 106 returns a write completion response to the host 102. Although not illustrated, the CPU 106 writes the write data written on the memory into the drive at a given timing (destage). In the present example, a description will be made assuming that the logs of the data and the control information are stored in the memory backup drive 107, but these logs may be recorded in, for example, a user data storage drive or another log storage drive.

In this write operation, the write data and the control information on the memory are written as logs in the memory backup drive to prepare for a case where a remaining controller fails. In a case where the remaining controller fails, the storage system is temporarily stopped (system down), but the data loss can be prevented by performing maintenance replacement of the controller and restoring the write data and the control information in the memory by using the logs written in the memory backup drive.

In order to prevent confusion in the following description, a difference between destage and log saving will be clarified. The destage is to write dirty data on the cache to a final storage area of the user data storage drive that is a final storage medium. In the user data storage drive, data protection, capacity efficiency, I/O performance, and the like are enhanced and stored by a storage function provided by a storage system (mainly a controller). For example, in the data protection, data is protected by using a method such as RAID 6, and in this case, parity data is generated in a destage process, and parity data is also written in the drive. In the data of which destaging has been completed, the data on the memory and the data on the drive are in a matching state (clean), and thus the data may be lost from the memory.

On the other hand, the log saving refers to temporarily writing update contents of data and control information on a memory into a non-volatile storage medium (drive) such as a memory backup drive in preparation for a failure of a controller. As described above, when the destaging of the dirty data is completed, there is no problem even if the dirty data written as a log in the drive is lost from the memory. Therefore, the log can be deleted from the drive when the destaging is completed.

In a case where the memory backup drive 107 is used for storing a log in the present example, an area allocated to save the contents of the memory when both controllers are normal may be used as an area for storing the log when one controller is failed. With this configuration, an additional drive and an additional storage capacity are not required for log storage, which is advantageous in terms of cost compared with a case where a log is stored in the user data drive or a case where a log storage drive is separately mounted.

Incidentally, data written from the host is generally handled in units of blocks such as 512 bytes or 4 KiB in the log (cache data log) including update contents of the cache data, and thus the granularity is relatively large, whereas the control information is in units of bytes, and thus the log (control information log) including update contents of the control information has a relatively small granularity. A proportion of the cache data area occupying the entire memory is relatively large. Therefore, regarding the control information log, the entire memory area (base image) in which the control information is stored is periodically written into the drive, all the logs written before that are discarded, and the area where the logs are written is collected as a free area. This method is referred to as a base image saving method. On the other hand, regarding the cache data log, an unnecessary log that is not the latest among the logs is identified, and the unnecessary log is discarded (invalidated). With this configuration, scattered free areas can be created in the log area, and thus, continuous free areas are collected by writing only valid logs into another area in a front-crammed manner at a given timing. This method is referred to as a garbage collection method. By using these methods, it is possible to reduce management information for free area management and reduce the overhead for free area recovery while suppressing the capacity consumption for base image saving.

Figure 4:
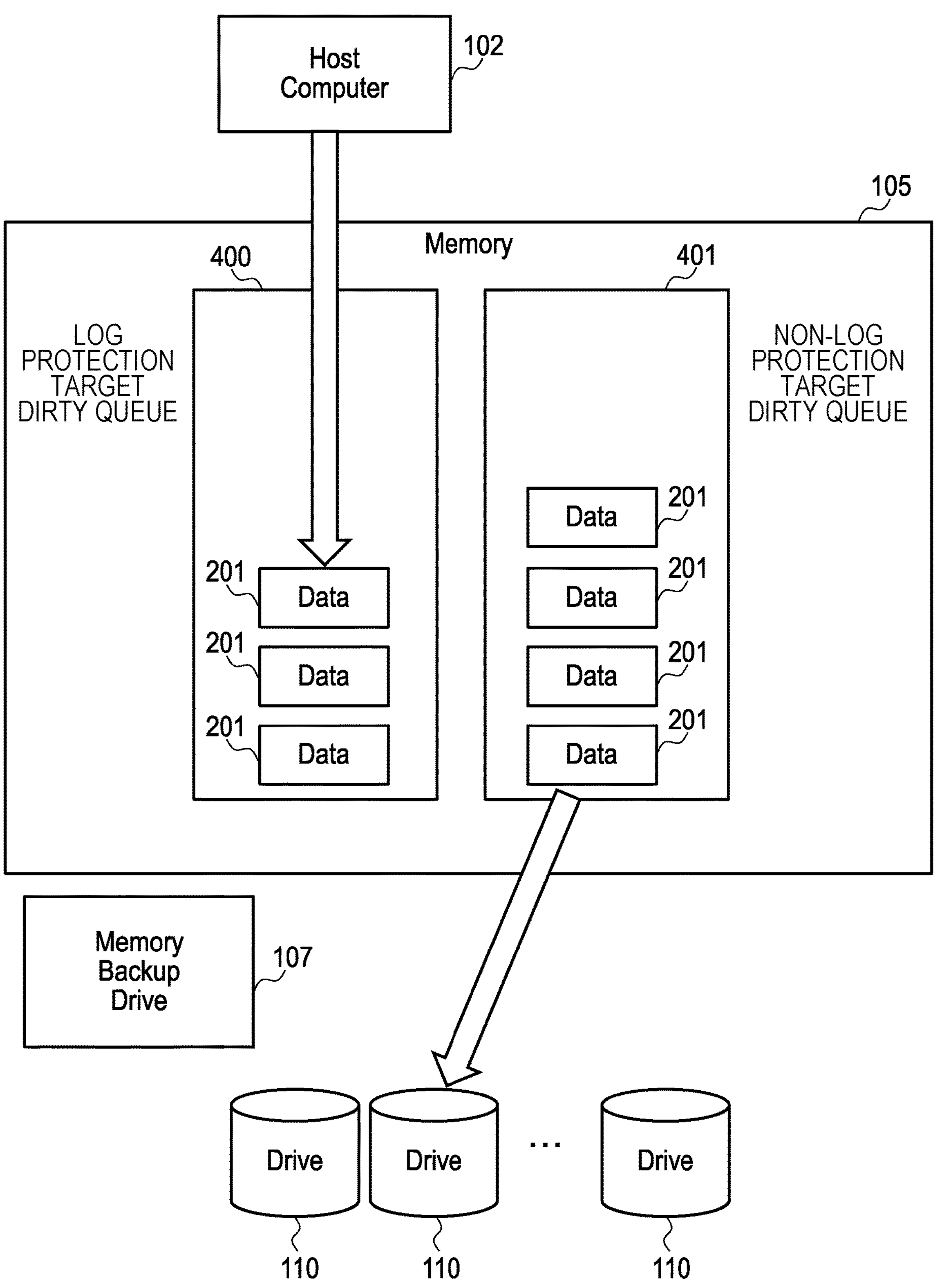
FIG. 4 is a diagram illustrating an outline of differentiation of dirty data.

FIG. 4 is a diagram illustrating an outline of differentiation of dirty data in the storage system of the present example.

In a case where one controller fails during operation of the storage system, if the remaining one controller also fails in a state in which write data (dirty data) not stored in the drive remains in the memory, the dirty data is lost. That is, data that has been written in the storage system (for which a write completion response has been returned) is lost, which is a serious problem in a storage system requiring high reliability. Therefore, in a case where one of the controllers fails, it is important to write the dirty data on the memory to the storage device in as short a time as possible in order to improve the reliability of the storage system. However, the performance of the storage device that stores the dirty data as a log becomes a bottleneck, and it may take a long time to write the dirty data. This can be particularly problematic in a storage system configured to store logs in a small number of storage devices.

Therefore, in the storage system according to the present invention, dirty data (existing dirty) present on the memory at the time of failure of one controller and dirty data (new dirty) generated after the failure of the one controller are differentiated from each other, and the new dirty is written as a log in a storage device for log storage while the existing dirty is written in a user data drive. With this configuration, it is possible to avoid or alleviate the bottleneck of the log storage device, reduce the time required for saving the dirty data, reduce the occurrence probability of the data loss, and enhance the reliability.

Specifically, in the present example, two types of dirty queues such as a log protection target dirty queue 400 and a non-log protection target dirty queue 401 are provided in the memory, and the new dirty is connected to the log protection target dirty queue and the existing dirty is connected to the non-log protection target dirty queue.

Since the dirty data connected to the log protection target dirty queue is stored in the memory backup drive 107 as a log before the host response, in the destage process of writing the dirty data into the user data drive, the dirty data connected to the non-log protection target dirty queue is preferentially selected as a destage target and written into the drive. Details of the destage process will be described later with reference to a flowchart.

Note that, in the present example, the method of differentiating each piece of dirty data by using two types of dirty queues has been exemplified, but the number of types of dirty queues may be larger. The method of differentiating the dirty data is not limited to a method using a plurality of dirty queues, and for example, management may be performed by using a data structure such as a list, or a method of differentiating the dirty data by having identification information such as a flag in the control information of the cache may be used.

Figure 5:
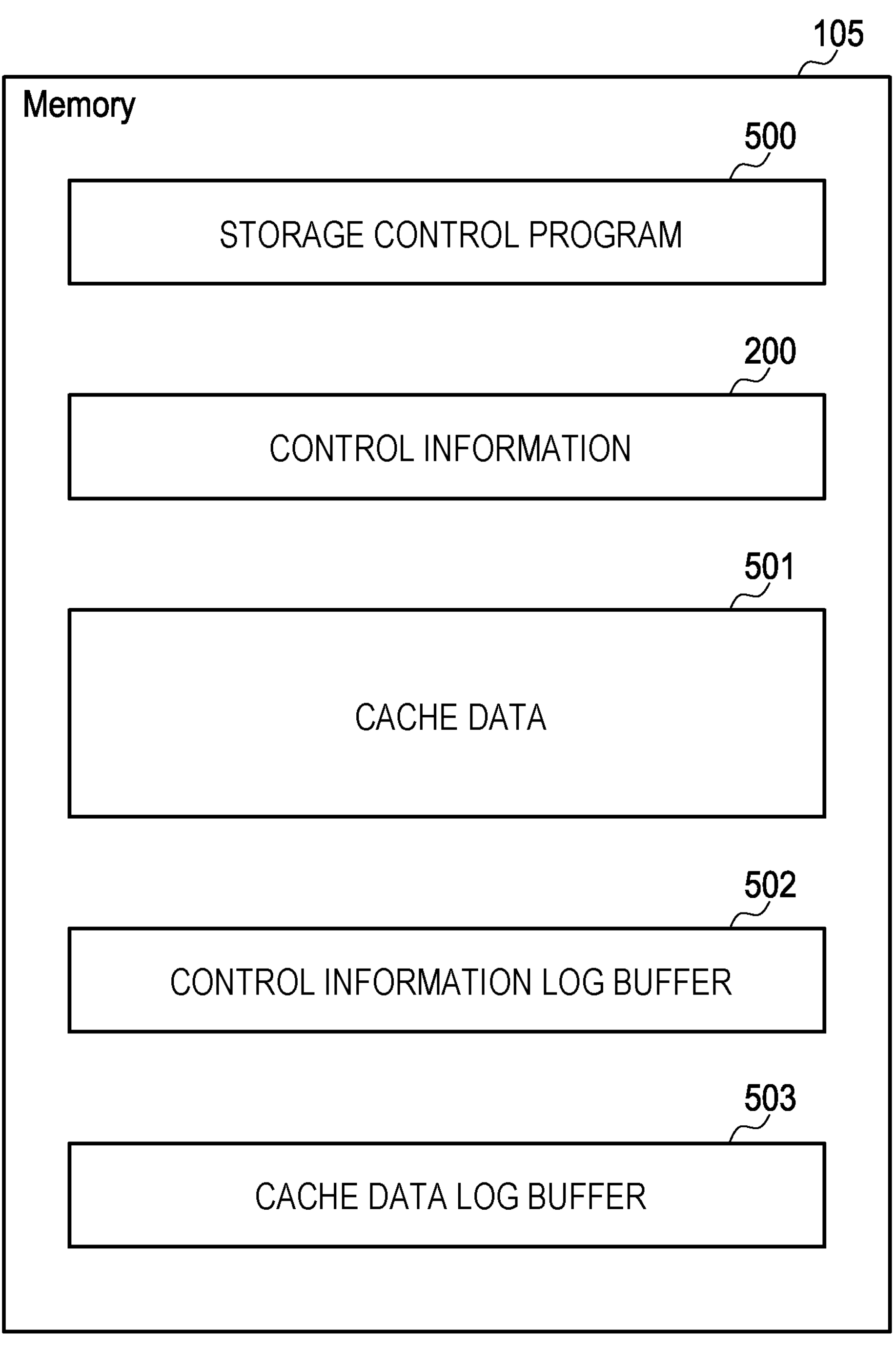
FIG. 5 is a diagram illustrating contents of a memory of a storage controller.

FIG. 5 is a diagram illustrating contents of the memory of the storage system according to the present example.

The memory 105 includes a storage control program 500, control information 200, cache data 501, a control information log buffer 502, and a cache data log buffer 503.

The storage control program 500 is a program for controlling the storage system, and is executed by the CPU 106. Each process such as a write process that will be described later is included in the contents of the storage control program.

The control information 200 is data used by the storage control program 500 to control execution of the program. The control information 200 includes, for example, cache control information including a correspondence relationship between an address of cache data and a logical block address (LBA) in a volume, a state (dirty/clean) of cache data, and the like, configuration information including a type/capacity of a drive, a type/configuration of a RAID group, and the like, and a state (normal/fail) of each controller. The dirty queue described above also belongs to the cache control information in the control information 200.

Incidentally, when the control information and the cache data in the memory are updated at the time of failing one controller, logs related to the contents are not necessarily written individually into the drive (memory backup drive 107) one by one, and may be written collectively into a continuous area on the drive (memory backup drive 107). However, for example, before a write completion response is returned to the host, cache data and control information updated through the write process are written into the drive (memory backup drive 107) to prevent the data that has been written from being lost due to a controller failure. The control information log buffer 502 and the cache data log buffer 503 are buffers for temporarily storing logs on the memory as described above, and respectively temporarily store the control information log and the cache data log.

Figure 6:
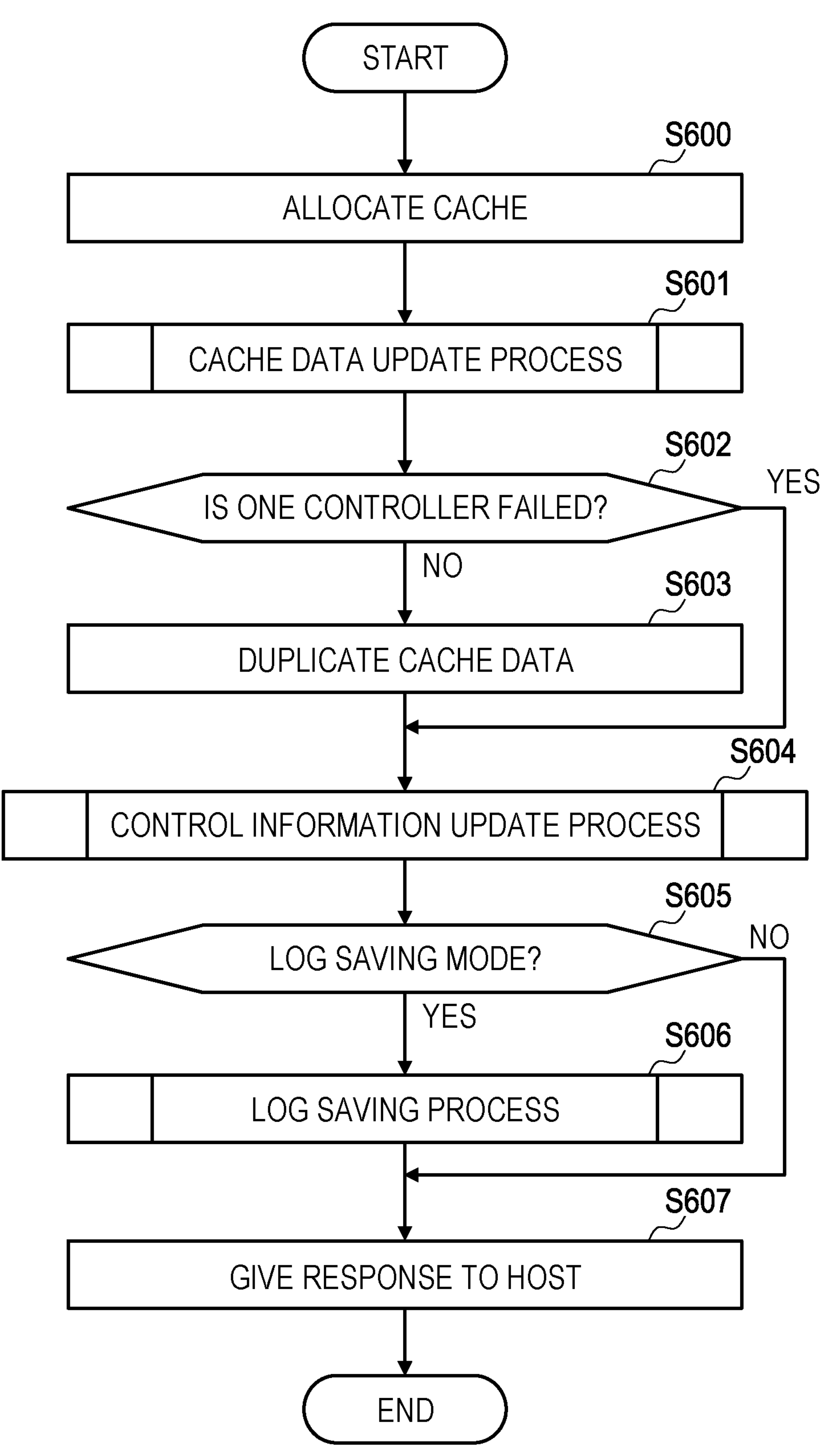
FIG. 6 is a flowchart illustrating a write process.

FIG. 6 is a flowchart illustrating a write process in the storage system of the present example, and the CPU 106 executes this process.

First, the CPU 106 performs cache allocation (600). The cache allocation refers to allocating a part of an area for storing cache data in the memory for I/O processing or the like. Here, in order to store write data transmitted from the host, an area having a sufficient size for storing the data is allocated.

Subsequently, the CPU 106 performs a cache data update process (601). The contents of the cache data update process will be described later, but in short, the process is a process of receiving data from the host and storing the data in the cache area allocated above.

Next, the CPU 106 determines whether or not the other controller is failed (602). In a case where the controller is failed (Yes), a cache data duplicating process is skipped, and in a case where the controller is not failed (No), that is, in a case where both controllers are operating, the cache data duplicating is performed (603). The cache data duplicating is a process of copying the data received from the host to the memory of the other controller, and for example, the data is copied from the memory of the own controller to the memory of the other controller by using the DMA built in the CPU 106.

Next, the CPU 106 performs a control information update process (604). Details of the control information update process will be described later.

Next, the CPU 106 determines whether or not the mode is a log saving mode (605). In the case of the log saving mode (Yes), the log saving process is performed (606), and in the case of not the log saving mode (No), the log saving process is skipped. Details of the log saving process will be described later.

The CPU 106 that has completed the above processing give a response to the host that the write process has been completed (607). Thus, the write process is completed.

Figure 7:
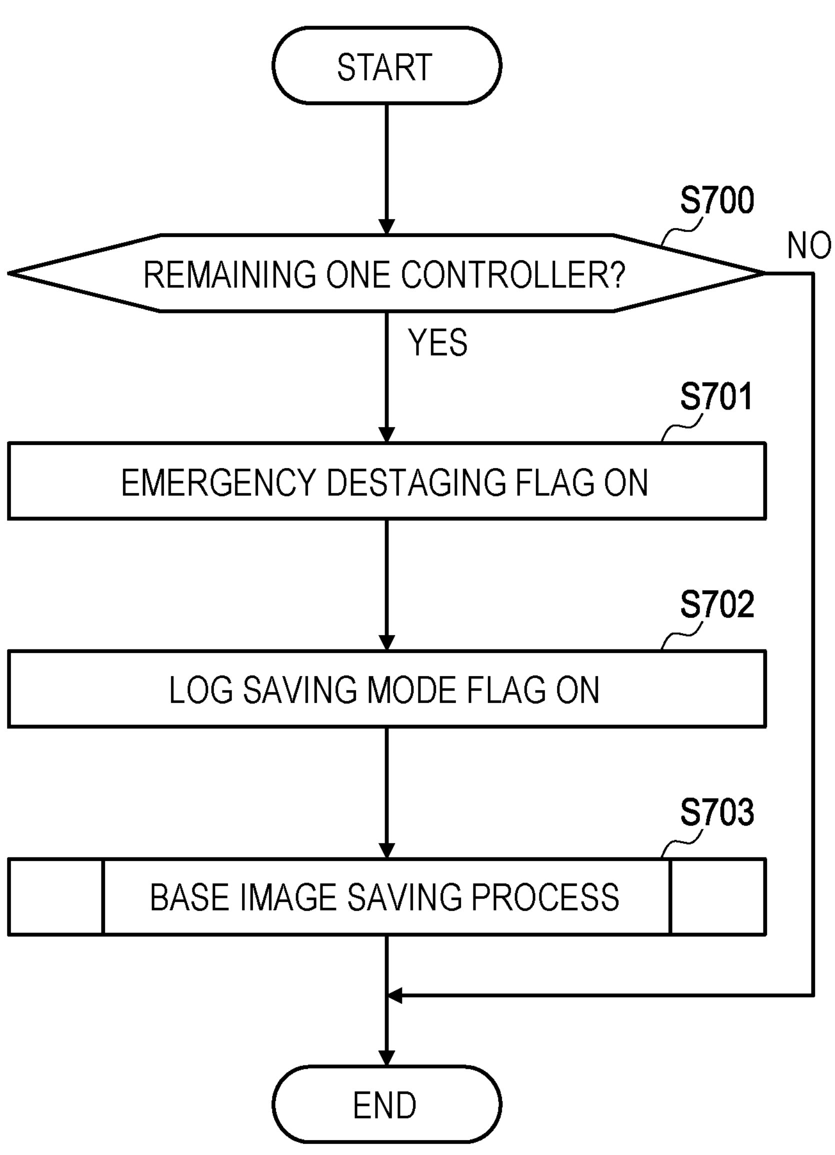
FIG. 7 is a flowchart illustrating a memory protection method switching process during a failure of one controller.

FIG. 7 is a flowchart illustrating a memory protection method switching process when one controller fails in the storage system of the present example. This process is executed to switch the memory protection method from duplicating between the controllers to protection using a log when it is detected that another controller is failed due to a failure or the like.

First, the CPU 106 determines whether or not there is one normal controller remaining in the system (that is, only the own controller) (700). In a case where the number of remaining controllers is one (Yes), the process proceeds to step 701. In a case where the number of remaining controllers is not one (No), all the remaining steps are skipped, and the process is ended.

Next, the CPU 106 sets an emergency destaging flag to ON (701). As a result, an operation of the destage process that will be described later is changed. While the emergency destaging flag is ON, the CPU 106 increases the execution frequency of the destage process in order to store the dirty data in the drive as soon as possible.

Next, the CPU 106 sets a log saving mode flag to ON (702). As a result, the CPU 106 creates a log when updating the memory.

Finally, the CPU 106 executes a base image saving process (703). Details thereof will be described later. As described above, the memory protection method switching process when one controller fails is completed.

Figure 8:
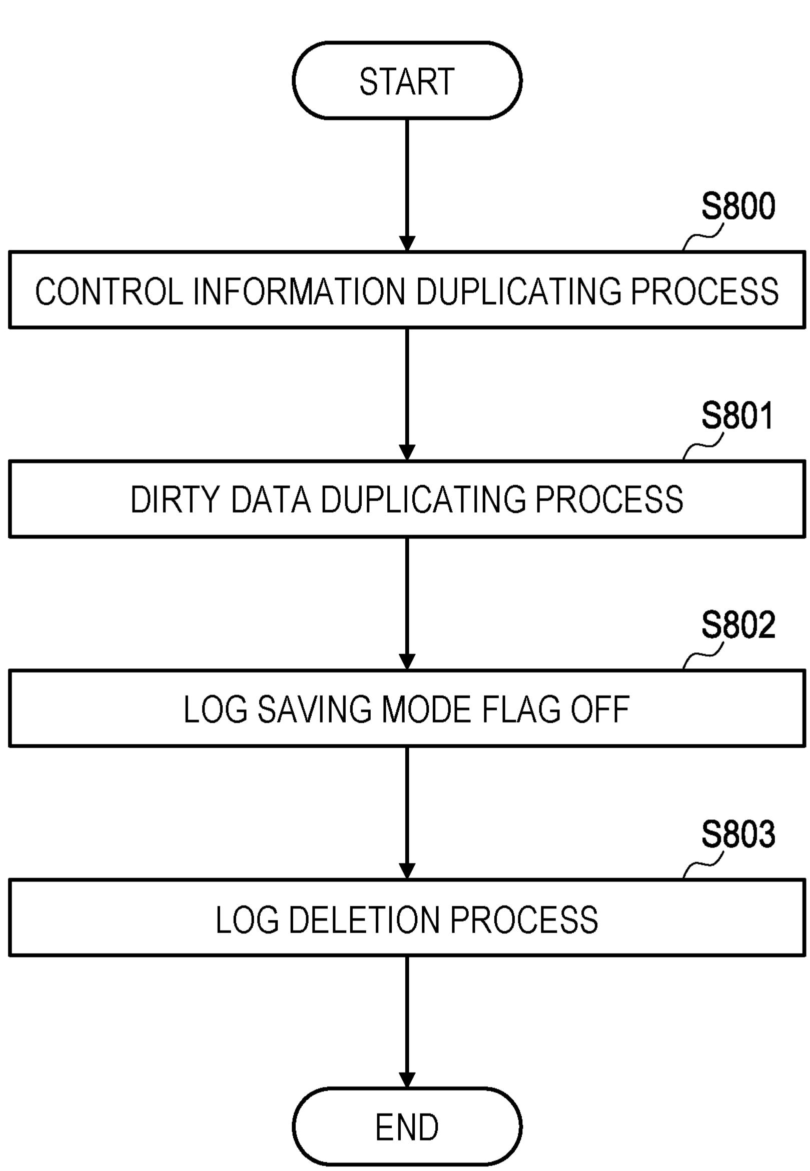
FIG. 8 is a flowchart illustrating a memory protection method switching process during controller recovery.

FIG. 8 is a flowchart illustrating a memory protection method switching process during controller recovery in the storage system of the present example. This process is executed to switch (return) the memory protection method from protection using a log to duplicating between the controllers when it is detected that another controller is recovered through maintenance replacement or the like and enters a state in which another controller can normally operate.

First, the CPU 106 performs a control information duplicating process (800). This process is a process of copying the control information on the memory to the memory of the recovered controller. When all the control information is copied, the copying is completed.

Next, the CPU 106 performs a dirty data duplicating process (801). This is a process of copying the dirty data on the memory to the memory of the recovered controller. Each time each piece of dirty data is copied, cache control information related to the dirty data is updated. When all the pieces of dirty data have been copied, the copying is completed. Instead of copying the dirty data to another controller as in the present example, a method of protecting the dirty data by destaging the dirty data to a drive may be employed.

Next, the CPU 106 sets the log saving mode flag to OFF (802). With this configuration, in the subsequent memory update, data is not saved as a log in the drive.

Finally, the CPU 106 performs a log deletion process (803). This process is a process of deleting all the logs written in the log storage drive (memory backup drive 107) and the logs in the log buffer. For example, all logs stored in a drive or a memory may be overwritten with invalid data such as all zeros, or all logs may be invalidated by setting valid flags of all log headers to OFF.

As described above, the memory protection method switching process during controller recovery is completed.

Figure 9:
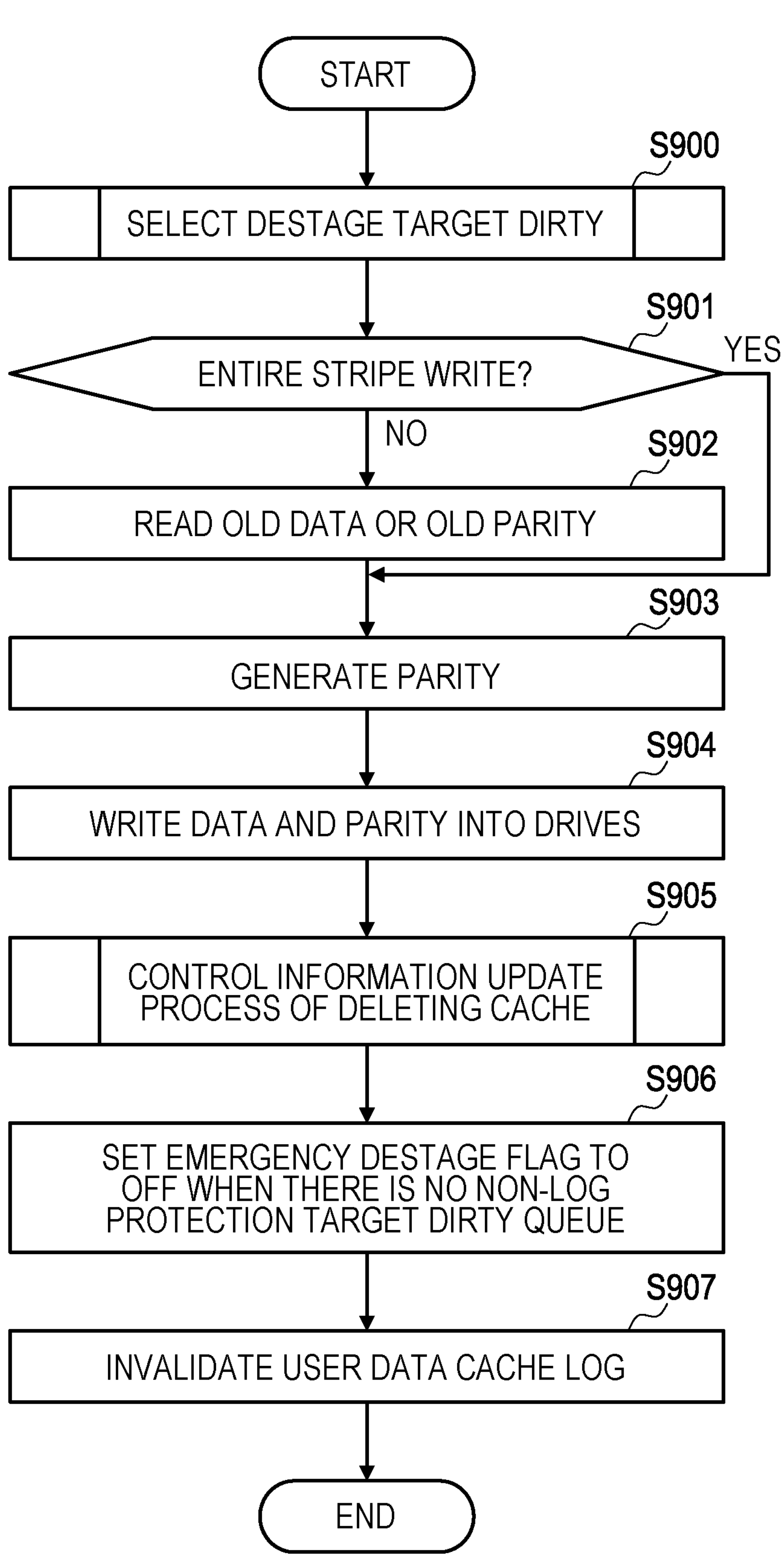
FIG. 9 is a flowchart illustrating a destage process.

FIG. 9 is a flowchart illustrating a destage process in the storage system of the present example.

This destage process is started at a given timing when dirty data is present in the memory. The starting frequency of the destage process is adjusted depending on an amount of dirty data or a state of the storage system. For example, the starting frequency increases as an amount of dirty data increases. In a case where one controller is failed and there is dirty data that is not a log protection target and is not stored in the drive, the destage process is started particularly frequently.

In the destage process, first, the CPU 106 performs destage target data selection (900). Details of the process will be described later. When the destage target data is determined, next, the CPU 106 determines whether or not writing of the entire stripe can be executed (901). This is, for example, determination as to whether or not all data for one stripe in a data protection method such as RAID 5 or RAID 6 are present in the cache. In a case where data for one stripe is stored in the cache, new parity data can be generated without reading old data or old parity data from the drive. Therefore, in a case where writing of the entire stripe is not executable (No), the CPU 106 reads the old data and the old parity data necessary for the parity update from the drives (902), and in a case where writing of the entire stripe is executable (Yes), the CPU 106 skips this process.

Next, the CPU 106 generates new parity data (903) and writes the data and the parity data into the drives (904).

Subsequently, the CPU 106 performs a control information update process of deleting the cache (905). In this process, the cache control information is updated, and the memory allocation of the cache data for which destaging has been completed is released. Alternatively, identification information such as a flag indicating a dirty state may be set to OFF and thus data may remain on the memory as clean cache data (data on the drive matches contents). Details of the control information update process will be described later.

Next, when there is no non-log protection target dirty queue, the CPU 106 sets the emergency destage flag to OFF (906).

Finally, the CPU 106 invalidates the user data cache log related to the destaged dirty data (907). As described above, the destage process is completed.

Figure 10:
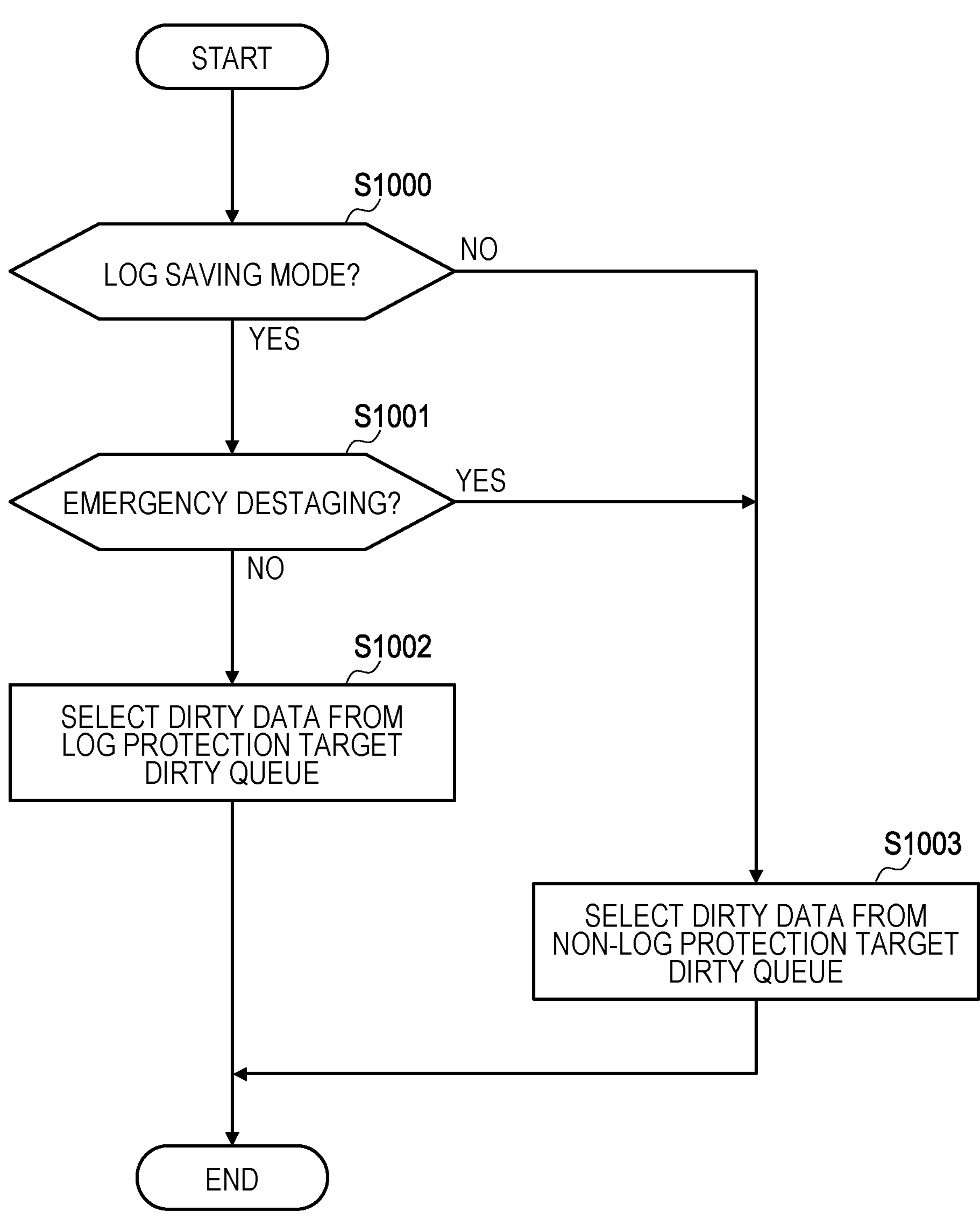
FIG. 10 is a flowchart illustrating a destage target dirty selection process.

FIG. 10 is a flowchart illustrating destage target dirty selection process in the storage system of the present example.

First, the CPU 106 determines whether or not the system is in a log saving mode (1000). Information indicating the log saving mode is stored in the control information in the memory as a flag, for example, and the CPU 106 determines the mode with reference to this information. If the mode is the log saving mode (Yes), the process proceeds to step 1001, and if the mode is not the log saving mode (No), the process proceeds to step 1003. In step 1001, it is determined whether or not emergency destaging is being performed. Information indicating the emergency destage is also stored in the control information in the memory as a flag, for example. In a case where the emergency destaging is being performed (Yes), the CPU 106 proceeds to step 1003, and in a case where the emergency destaging is not being performed (No), the CPU 106 proceeds to step 1002. In step 1002, the CPU 106 selects dirty data that is a destage target from the log protection target dirty queue. Specifically, for example, dirty data is extracted (dequeued) from the head of the dirty queue, and the dirty data is set as a destage target. On the other hand, in step 1003, the CPU 106 selects dirty data that is a destage target from the non-log protection target dirty queue.

Figure 11:
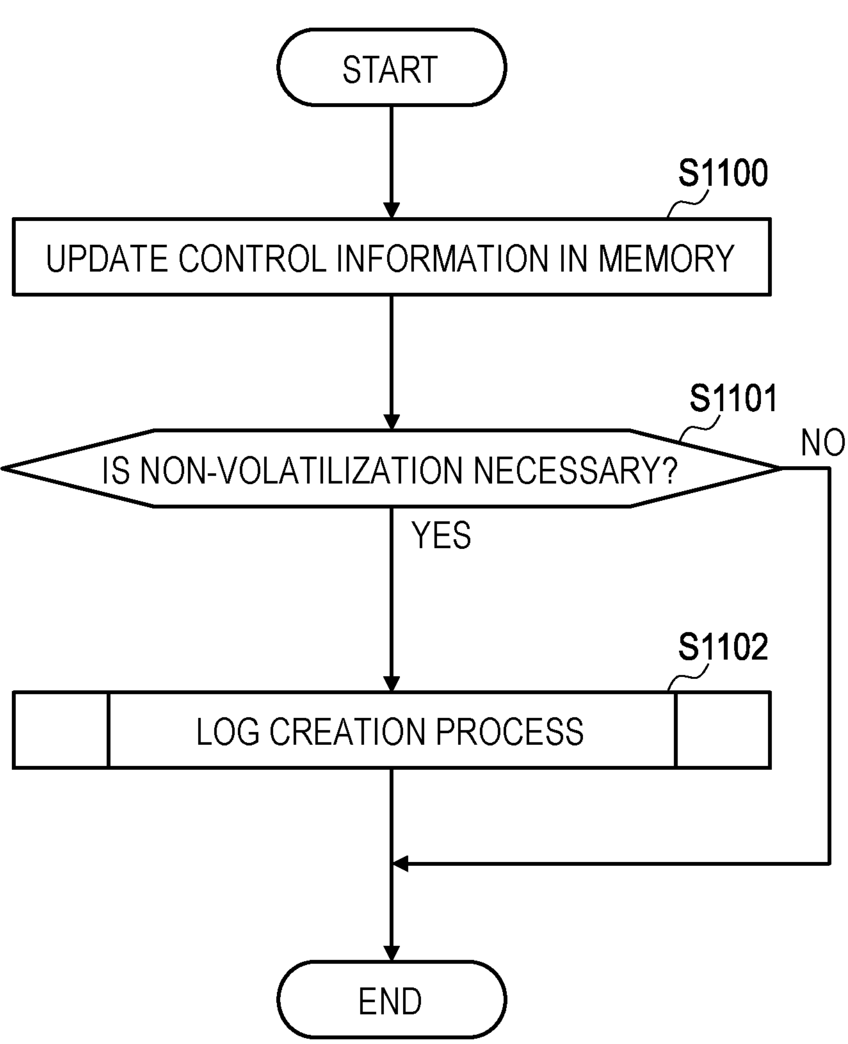
FIG. 11 is a flowchart illustrating a control information update process.

FIG. 11 is a flowchart illustrating a control information update process in the storage system of the present example.

First, the CPU 106 updates the control information in the memory (1100). Next, the CPU 106 determines whether or not non-volatilization is necessary (1101). In a case where non-volatilization is necessary (Yes), a log creation process is performed (1102), and in a case where non-volatilization is unnecessary (No), the process is skipped. Details of the log creation process will be described later. As described above, the control information update process is completed.

Figure 12:
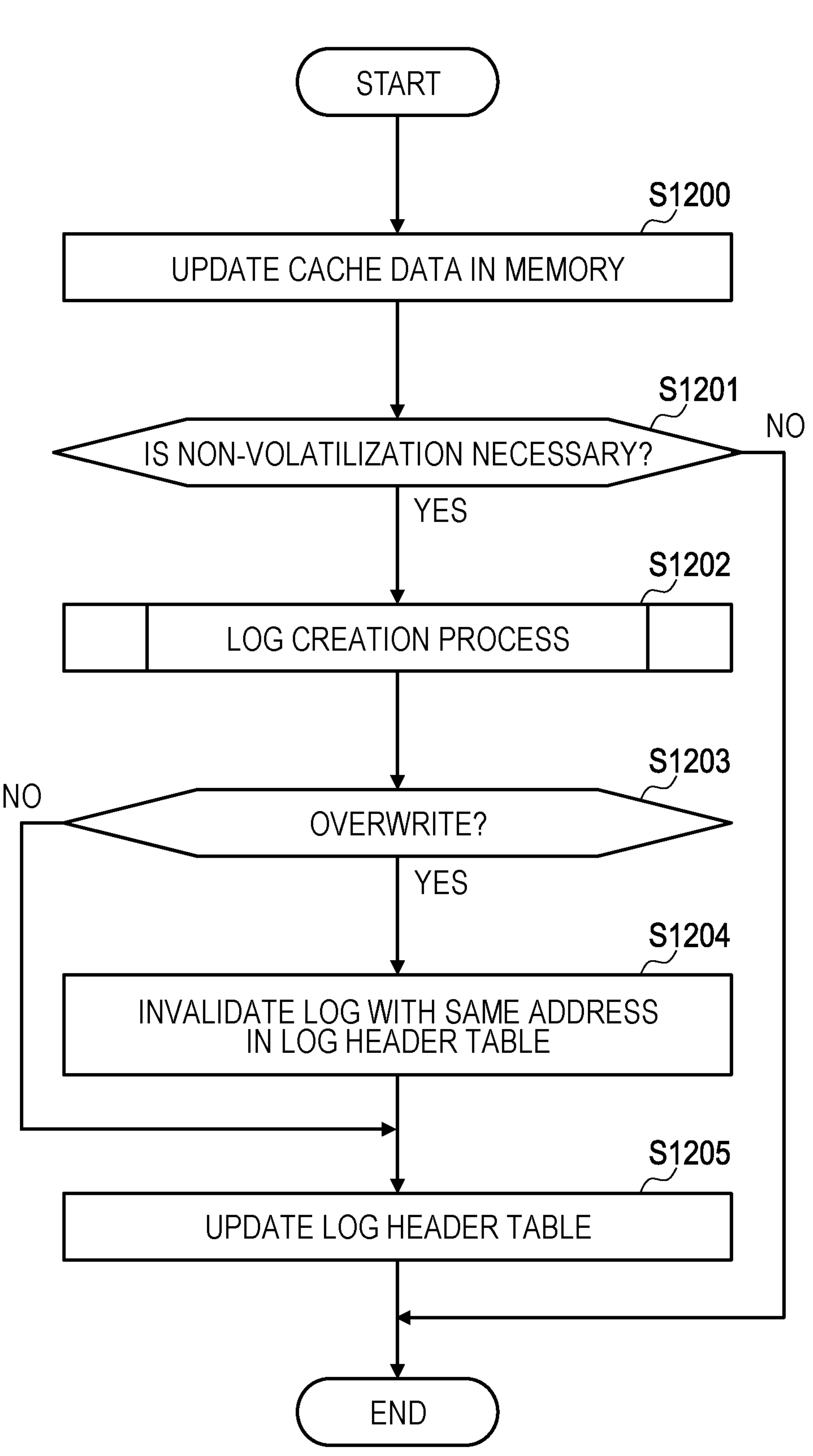
FIG. 12 is a flowchart illustrating a cache data update process.

FIG. 12 is a flowchart illustrating a cache data update process in the storage system of the present example.

First, the CPU 106 updates cache data in the memory (1200). Specifically, for example, data received from the host is written into a cache area allocated in the memory.

Next, the CPU 106 determines whether or not non-volatilization is necessary (1201). In a case where non-volatilization is necessary (Yes), the process proceeds to step 1202, and in a case where non-volatilization is unnecessary (No), the subsequent process is skipped and the cache data update process is ended. Step 1202 is a log creation process. This process is a process of creating a log related to updated cache data, and details thereof will be described later.

Next, the CPU 106 determines whether or not the current cache data update is performed through overwriting (1203). That is, it is checked whether or not a log (referred to as a "log of the same address") related to the cache data update in an address range included in a range of the cache area updated this time is present in existing logs, and in a case where the log is present, it is determined that the cache data update is performed through overwriting. In the case of overwriting (Yes), the log of the same address written in the log header table is invalidated (1204), and in the case of not overwriting (No), this process is skipped.

Finally, the CPU 106 updates the log header table (1205). Thus, the cache data update process is completed.

Figure 13:
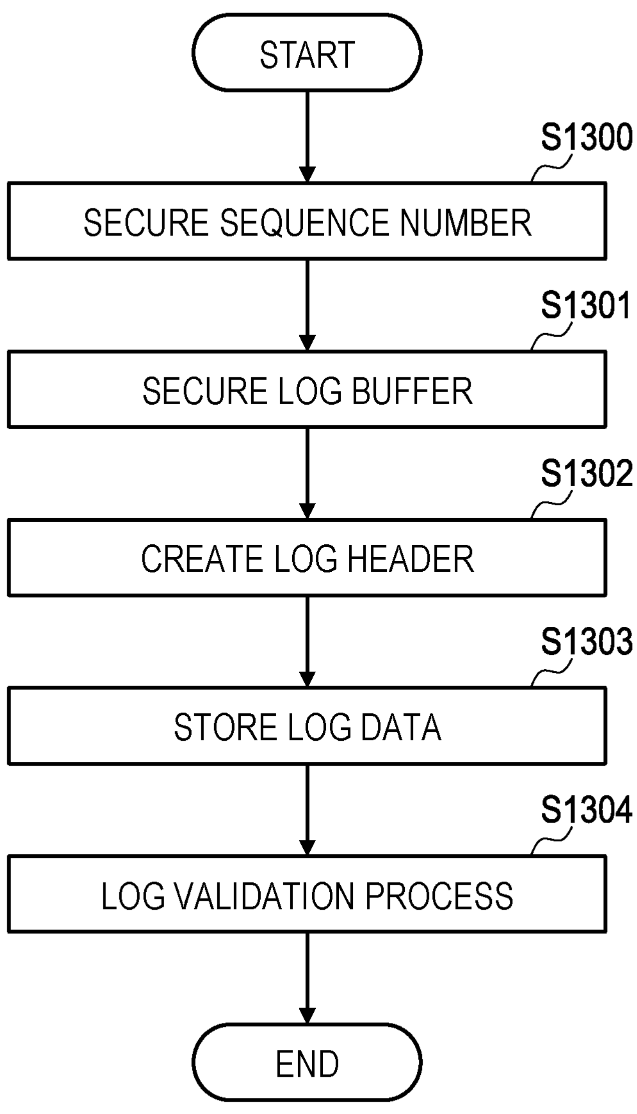
FIG. 13 is a flowchart illustrating a log creation process.

FIG. 13 is a flowchart illustrating a log creation process in the storage system of the present example.

First, the CPU 106 secures a sequence number (1300). The sequence number is a number indicating the order in which a log is created, and a value is increased one by one each time a new log is created.

Next, the CPU 106 secures a log buffer for temporarily storing logs (1301). Specifically, in a case where the data to be stored in the log is control information, an area having a size necessary for storing a creation target log is allocated from the control information log buffer, and in a case where the data to be stored in the log is cache data, an area having a size necessary for storing the creation target log is allocated from the cache data log buffer.

Subsequently, the CPU 106 creates a log header (1302). The log header includes a sequence number, an address of the target data on the memory, a size of the target data, and the like. Next, the CPU 106 stores the log data in the log buffer (1303).

Finally, the CPU 106 performs a process of validating the created log (1304). Specifically, for example, a flag indicating validity/invalidity of the log is included in the log header, and the log is validated by setting the flag to ON. Thus, the log creation process is completed.

Figure 14:
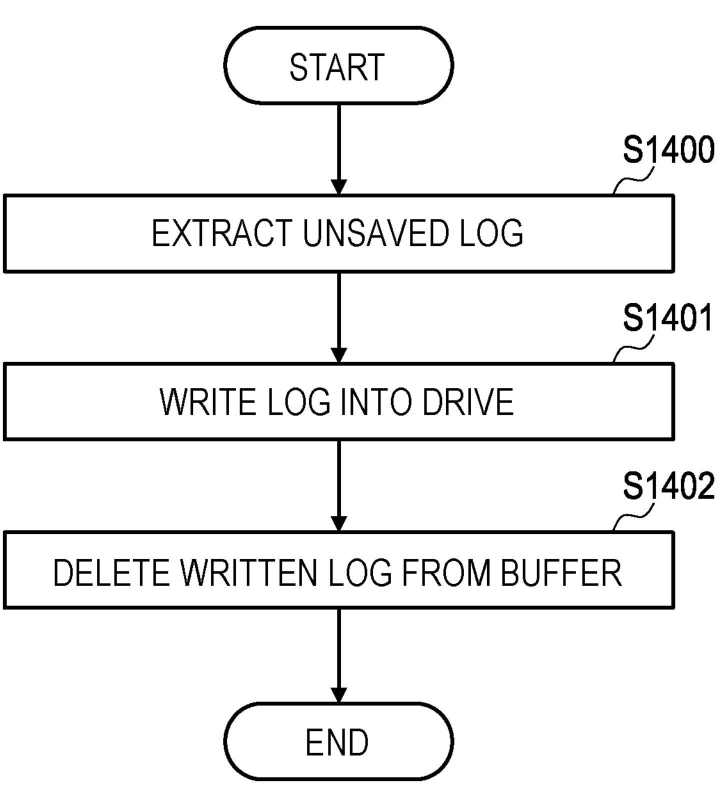
FIG. 14 is a flowchart illustrating a log saving process.

FIG. 14 is a flowchart illustrating a log saving process in the storage system of the present example.

The log saving process is a process of writing logs accumulated in the log buffer into the drive, and is called when writing of the logs into the drive is necessary as called before the host response in the above-described write process flowchart.

First, the CPU 106 extracts an unsaved log, that is, a log that has not yet been written in the log storage drive, from the log buffer of the memory 105 (1400).

Next, the CPU 106 writes the log into the log storage drive (memory backup drive 107) (1401).

When the writing is completed, the CPU 106 deletes the written log from the log buffer (1402). As described above, the log saving process is completed.

Figure 15:
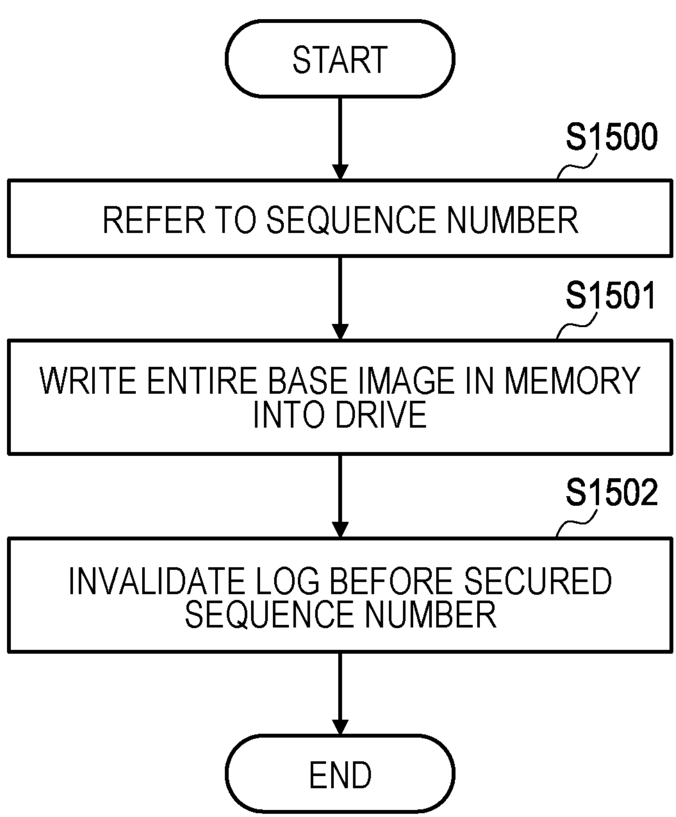
FIG. 15 is a flowchart illustrating a base image saving process.

FIG. 15 is a flowchart illustrating a base image saving process in the storage system of the present example.

As described above, the base image saving process is a process of writing the entire memory area that is a protection target into the drive, and is used to protect the control information in the present example, and is executed at a given timing, for example, when a certain amount or more of control information logs on the drive is accumulated.

First, the CPU 106 refers to the sequence number and stores the latest sequence number at the current time (1500).

Next, the CPU 106 writes the entire base image of the memory to the drive (1501). When this process is completed, the old log is unnecessary, and thus the CPU 106 invalidates all the logs before the sequence number secured (stored) in step 1500 (1502). As described above, the base image saving process is completed.

FIG. 16 is a flowchart illustrating a log recovery process in the storage system of the present example.

This process is executed during a process of starting the system after the system is down since both controllers are failed and then maintenance replacement work for the controller or the like is performed, so that the control information and the dirty data stored in the memory before the system is down are recovered. This process is executed by the CPU 106 of a predetermined controller in the system before resuming the reception of the I/O.

First, the CPU 106 reads the base image from the base image area on the log storage drive and stores the read base image in the control information area on the memory (1600).

Next, the CPU 106 reads the control information log and the cache data log from the log storage drive, and sorts the logs in chronological order according to the sequence number (1601). The contents from the oldest log to the latest log are reflected in the respective areas of the control information and the cache data on the memory in order according to the address information written in the log header (1602). As described above, the log recovery process is completed.

Example 2

Next, Example 2 will be described.

Figure 17:
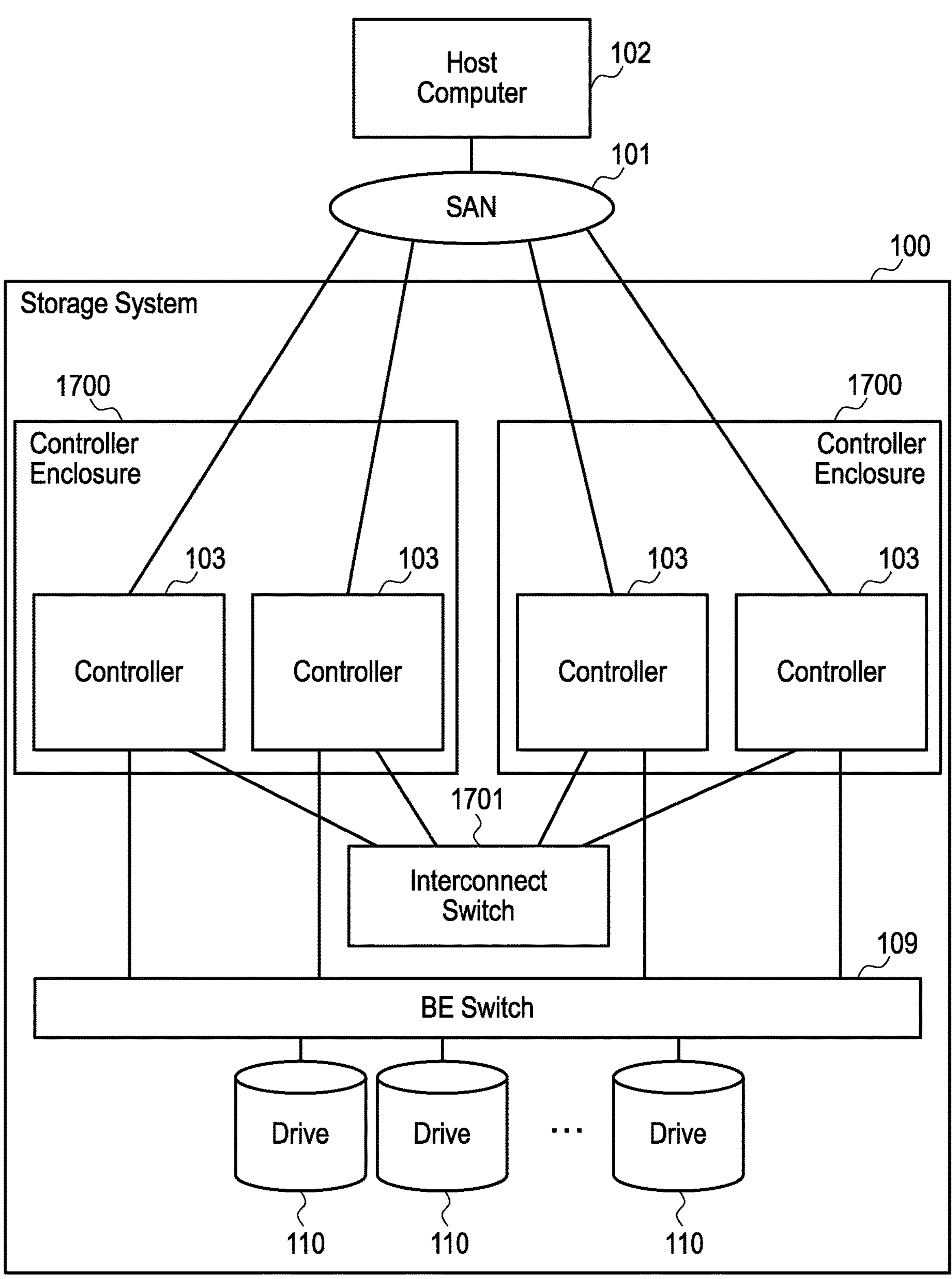
FIG. 17 is a configuration diagram of a storage system according to Example 2.

FIG. 17 is a diagram illustrating a configuration example of a storage system according to the present example.

A storage system 100 of the present example includes a plurality of controllers 103 and a drive 110 that is a storage device, and each controller and the drive are connected via, for example, a switch (BE Switch) 109. The respective controllers 103 are connected to an interconnect switch 1701 and can communicate with each other. The interconnect switch is, for example, a PCIe switch, an Ethernet switch, an Infiniband switch, or the like.

Note that the controller of the present example includes a CPU, a memory, a memory backup drive, a front end interface, and a back end interface similarly to the controller of Example 1, but are not illustrated in the drawing.

In the present drawing, a configuration in which two controllers are mounted in a single controller enclosure has been described as an example, but a configuration for carrying out the present invention is not necessarily limited to this configuration. For example, each controller may be mounted in an independent housing, or three or more controllers may be mounted in a single controller enclosure.

Although the configuration in which a single storage system includes four controllers is illustrated in the present drawing, the number of controllers may be three or more in the present example, and the present invention is not necessarily limited to the configuration in which the number of controllers is four.

The storage system is connected to a storage area network (SAN) 101 such as Fibre Channel or Ethernet, and a host computer (hereinafter, referred to as a host) 102 is also connected to the SAN 101. The SAN 101 may include a switch and the like. A plurality of hosts may be connected to the SAN 101.

As is clear from the drawing, a main difference between Example 1 and the present example is the number of controllers.

In the present example, even if one of three or more controllers fails, data can be made redundant on memories of the remaining two or more controllers. Therefore, in the present example, while there are two or more normal controllers, an operation is performed in the same manner as in a normal state of both controllers in Example 1, and control information and user data are made redundant between the memories of the controllers. In a case where there is only one remaining normal controller, the controller switches to the log saving mode and operates as in the case where one controller is failed in Example 1.

As described above, the disclosed storage system is a storage system including a drive 110 that is a non-volatile storage device, and a plurality of storage controllers 103 that control reading from and writing to the storage device, in which the storage device is a user data storage drive, each of the plurality of storage controllers 103 includes a processor (CPU 106) and a memory 105, the storage controller 103 includes a first memory protection method that is a memory copying method of copying data on the memory to a memory of a corresponding storage controller, and a second memory protection method that is a log saving method of generating a log related to update of the data on the memory and writing the log into a non-volatile medium, and the storage controller stores a write request from a host for the storage device as cache data in the memory, and protects the cache data in the first memory protection method or the second memory protection method, returns a write completion response to the host and destages the cache data into the storage device after the write completion response, and the storage controller switches between the first memory protection method and the second memory protection method to be used according to an operation state of another storage controller.

The storage controller forms a redundant configuration in association with another storage controller, and is used in the first memory protection method, and is used in the second memory protection method in a case where the corresponding storage controller is failed.

As described above, the storage controller recognizes a state of another controller in the system, and operates according to the write-back method in a case where the other controller is normal. In a case where the other controller is in an abnormal state such as a failure, the storage controller generates a log related to the update of the memory contents and writes the log into the storage device at the time of reading and writing. As a result, the number of times of drive access required before the host response can be reduced compared with that in the write-through method, and thus the response performance can be enhanced, so that a storage system and a data protection method having both high performance and high reliability can be realized.

The non-volatile medium in which the log is written is, for example, the memory backup drive 107 provided inside the storage controller 103.

As described above, by providing the memory backup drive 107 inside the storage controller 103, the time until completion of writing the log is reduced, and high performance can be realized.

A part of the non-volatile storage device may be used as the non-volatile medium in which the log is written.

In this configuration, a configuration of the storage controller 103 can be simplified, and the cost can be reduced.

In a case where it is detected that the corresponding storage controller is failed, the storage controller 103 performs operation switching from the memory copying method to the log saving method, preferentially destages pre-switching cache data (non-log protection target dirty queue 401) that is cache data before the operation switching into the storage device, and destages post-switching cache data (log protection target dirty queue) that is cache data after the operation switching after destaging all the pre-switching cache data. Thereafter, in a case where recovery from the failing of the corresponding storage controller is detected, the storage controller 103 copies the data on the memory to the memory of the corresponding storage controller, deletes the log, and performs operation switching from the log saving method to the memory copying method.

Thus, the pre-switching cache data that is not protected according to the memory copying method can be destaged early, and the risk of data loss can be reduced.

Note that the present invention is not limited to the above examples, and includes various modifications. The above-described examples have been described in detail in order to describe the present invention in an easy-to-understand manner, and are not necessarily limited to those having all the described configurations. The configuration is not limited to the deletion, and the configuration can be replaced or added. For example, although the case where the controller fails has been described, the present invention may be applied to a case where one of the controllers is stopped for the purpose of reducing power consumption.

What is claimed is:

1. A storage system comprising:

one or more non-volatile storage devices; and a plurality of storage controllers coupled to a host and coupled to the one or more non-volatile storage devices that control reading and writing for the one or more non-volatile storage devices, wherein the one or more non-volatile storage devices store user data, wherein each of the plurality of storage controllers includes a processor and a memory, and each of the plurality of storage controllers are respectively physically connected to all of the one or more non-volatile storage devices in the storage system without any other storage controllers connected between the each of the plurality of storage controllers and the one or more non-volatile storage devices and each of the plurality of storage controllers is configured to control all of the one or more non-volatile storage devices without using another intervening storage controller, wherein each of the plurality of the storage controllers are configured to individually implement a first memory protection method that is a memory copying method, and a second memory protection method that is a log saving method, and upon a first storage controller, which is any one of the plurality of storage controllers, executing the first memory protection method, data on a first memory of the first storage controller is copied to a second memory of a corresponding second storage controller, among the plurality of storage controllers, and upon the first controller executing the second memory protection method, a log which is update content of control information related to update of the data on the first memory is generated and the log is written into a non-volatile medium, wherein the first storage controller stores a write request from a host for the one or more non-volatile storage devices as cache data in the first memory, returns a write completion response to the host after protecting the cache data in the first memory protection method or the second memory protection method, and destages the cache data into the one or more non-volatile storage devices after the write completion response, wherein the first storage controller switches between the first memory protection method and the second memory protection method to be used according to an operation state of another of the plurality of storage controllers, and wherein in the case of the second memory protection method:

a storage controller, among the plurality of storage controllers, recovers the state of the other storage controller after deleting the log, and the log is deleted without being applied after dirty data corresponding to the log is destaged to the one or more nonvolatile storage devices.

2. The storage system according to claim 1, wherein the first storage controller is associated with the second storage controller to form a redundant configuration, and is used in the first memory protection method, and is used in the second memory protection method in a case where the second storage controller is failed.

3. The storage system according to claim 2, wherein the non-volatile medium in which the log is written is provided inside the first storage controller.

4. The storage system according to claim 2, wherein a part of the one or more non-volatile storage devices is used as the non-volatile medium in which the log is written.

5. The storage system according to claim 2, wherein upon determining that the second storage controller is failed, the first storage controller performs operation switching from the memory copying method to the log saving method, preferentially destages pre-switching cache data that is cache data before the operation switching into a storage device of the one or more non-volatile storage devices, and destages post-switching cache data that is cache data after the operation switching, after destaging all the pre-switching cache data, and wherein upon determining recovery from the failing of the second storage controller is detected, the first storage controller copies the data on the first memory to the second memory of the second storage controller, deletes the log, and performs operation switching from the log saving method to the memory copying method.

6. The storage system according to claim 1, wherein in the destage, the data is stored in a final storage area of the one or more non-volatile storage devices by using a storage function provided by the storage system.

7. The storage system according to claim 1, wherein the log includes a control information log and a cache data log and the control information log comprises a plurality of control information logs and the cache data log comprises a plurality of cache data logs and the control information log and the cache data log are respectively and temporarily stored in a control information log buffer and a cache data log buffer.

8. The storage system according to claim 7, wherein when recovering a capacity for storage areas of the memory in which logs which have been written to the one or more non-volatile storage devices are stored, a storage controller, among the plurality of storage controllers, perform a base image saving method, regarding the control information logs, for periodically writing an entire memory area (base image) in which control information is stored to the non-volatile medium discarding logs written before the writing, and collecting free areas and performs a garbage collection method, regarding the cache data logs, for identifying an unnecessary log that is not the latest among logs and invalidating the unnecessary log, and collecting continuous free areas by writing only valid logs into another area in a front-crammed manner at a given timing.

9. The storage system according to claim 1, wherein when data for updating data related to the log is written, the log which is related to the data before the update and is in the one or more non-volatile storage devices is invalidated.

10. A data protection method of a storage system including one or more non-volatile storage devices and a plurality of storage controllers that control reading and writing for the one or more non-volatile storage devices, wherein the one or more non-volatile storage devices store user data, wherein each of the plurality of storage controllers is coupled to a host and coupled to the one or more non-volatile storage devices and includes a processor and a memory, and each of the plurality of storage controllers are respectively physically connected to all of the one or more non-volatile storage devices in the storage system without any other storage controllers connected between the each of the plurality of storage controllers and the one or more non-volatile storage devices and each of the plurality of storage controllers is configured to control all of the one or more non-volatile storage devices without using another intervening storage controller, wherein each of the plurality of the storage controllers are configured to individually implement a first memory protection method that is a memory copying method, and a second memory protection method that is a log saving method, and upon a first storage controller, which is any one of the plurality of storage controllers, executing the first memory protection method, data on a first memory of the first storage controller is copied to a second memory of a corresponding second storage controller, among the plurality of storage controllers, and upon the first controller executing the second memory protection method, a log which is update content of control information related to update of the data on the first memory is generated and the log is written into a non-volatile medium, the data protection method comprising:

storing, by the first storage controller, a write request from a host for the one or more non-volatile storage devices in the first memory as cache data;

protecting, by the first storage controller, the cache data in the first memory protection method or the second memory protection method;

returning, by the first storage controller, a write completion response to the host;

destaging, by the first storage controller, the cache data into the one or more non-volatile storage devices after the write completion response; and switching, by the first storage controller, between the first memory protection method and the second memory protection method to be used according to an operation state of another storage controller, wherein in the case of the second memory protection method:

a storage controller, among the plurality of storage controllers, recovers the state of the other storage controller after deleting the log, and the log is deleted without being applied after dirty data corresponding to the log is destaged to the one or more non-volatile storage devices.

* * * * *